United States Patent [19]

Schmidthaler et al.

[11] Patent Number: 4,955,706
[45] Date of Patent: Sep. 11, 1990

[54] COMPOSITE POLYMERIC SPECTACLE PARTS

[75] Inventors: Johann J. Schmidthaler; Ronald Zach, both of Linz, Austria

[73] Assignee: Optyl Eyewear Fashion International Corporation, Norwood, N.J.

[21] Appl. No.: 252,265

[22] Filed: Sep. 30, 1988

[51] Int. Cl.$^5$ ............................................. G02C 11/02
[52] U.S. Cl. .................................................... 351/41
[58] Field of Search ................. 351/41, 111, 122, 124

[56] References Cited

U.S. PATENT DOCUMENTS

| 4,655,564 | 4/1987 | Czech | 351/41 |
| 4,798,453 | 1/1989 | Tokumara | 357/41 |

*Primary Examiner*—Paul M. Dzierzynski
*Attorney, Agent, or Firm*—Fitch, Even, Tabin & Flannery

[57] ABSTRACT

The present invention is directed to a composite, integral polymeric spectacle part. The spectacle part includes a first polymer member and a second polymer member. The polymer members are selected to provide desired characteristics for the spectacle part at the location of the spectacle part where the member is incorporated. In a particular embodiment, it is desirable that the first polymeric member be formed from an elastomeric polymer and that the second member be a substantially rigid polymer. The rigid polymer is preferably formed from a thermosetting polymer having a higher melting temperature than the first elastomeric member. The second rigid member is bound to the first polymer member by heat fusion during an injection molding process.

In the method of the invention for forming a composite, integral, polymeric spectacle part, a first polymer member is formed into a shape conforming to a portion of the cavity of an injection mold. The entire shape of the injection mold cavity defines the finished spectacle part. After the first polymeric member is inserted into the cavity portion, a second melted polymer, which has been heated to a suitable temperature above its melting temperature, is injected into the injection mold cavity so as to fill the cavity. The first polymer member and the second injected polymer are in abutting relationship in the injection mold cavity. A composite, integral polymeric spectacle part is prepared by activation and fusion of the first preformed polymer member by the heated second polymer.

3 Claims, 2 Drawing Sheets

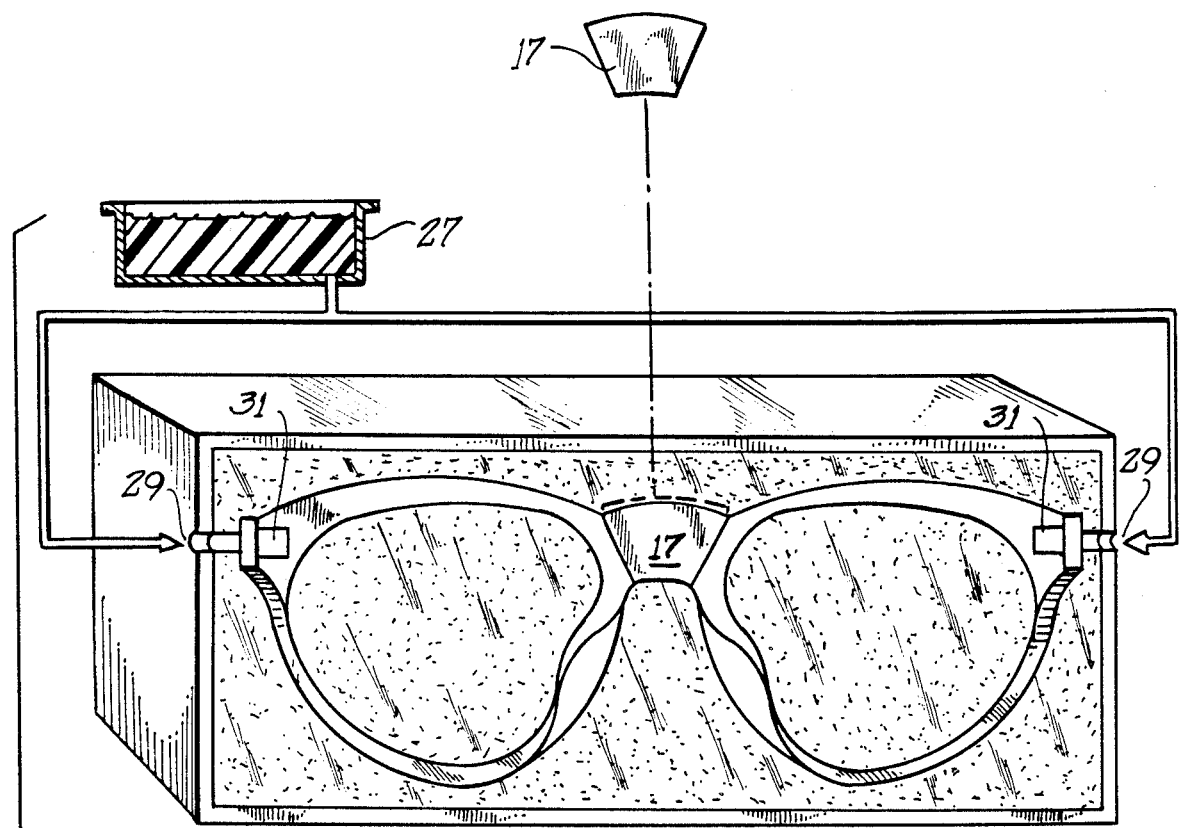
FIG.3
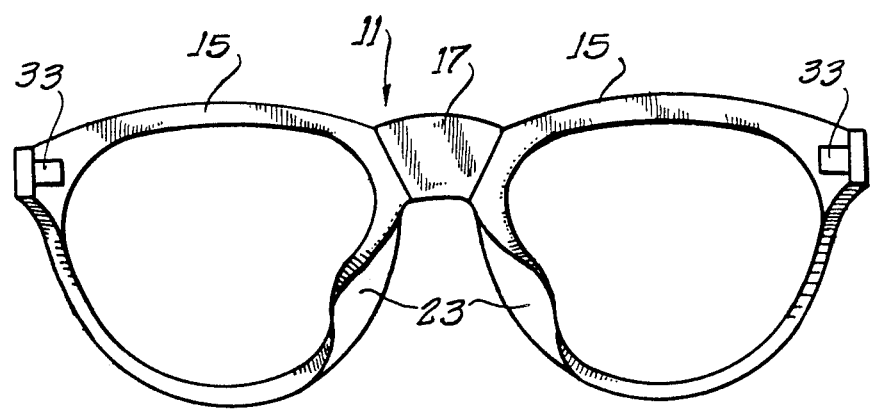

COMPOSITE POLYMERIC SPECTACLE PARTS

BACKGROUND OF THE INVENTION

1. Field of the Invention

This invention relates generally to a composite, integral, polymeric spectacle part. More particularly, the present invention relates to an integral spectacle part which includes a first elastomeric polymer member and a second substantially rigid polymer member which have been bonded together by heat fusion to form the integral spectacle part. The present invention also relates to a method for forming a composite, integral polymeric part.

2. Description of the Prior Art

The construction of spectacle parts to be used in holding a pair of lenses adjacent to the eyes of a wearer involves many compromises with respect to the nature of the parts. In general, the spectacle frames which are used to hold the lenses need to be of rigid construction to prevent the lenses from being inadvertently removed from the frame. The parts of the spectacle which are in contact with the head of the wearer are generally required to have non-abrasive, smooth, and resilient properties. These parts of the spectacle, which include the bridge between the frames, the nasal engaging pads and the curved portion of the bow which fits over the ears of the wearer are preferably fabricated from a smooth, resilient material which will not irritate the portions of the head of the wearer in which these parts come in contact. This is particularly true for spectacles which are designed for use for athletic purposes.

It is well known to manufacture spectacles from two or more dissimilar materials which are joined together by a mechanical attachment or by use of an adhesive.

For example, U.S. Pat. No. 3,584,939 to Olson et al. describes a spectacle frame which has a central bridge member upon which is mounted a coating of resilient material. The coating of resilient material completely encircles the bridge portion of the spectacle frame and extends partially around the nasal side of each lens support.

U.S. Pat. No. 4,666,265 to Takeda describes a slim spectacle rim part which is molded from a thermoplastic resin reinforced with short fibers. The spectacle rim part of the Takeda Patent is so rigid that a frame lock joint construction is required for the spectacle rims. Frame lock joint construction refers to a type of open rim, usually metal but in the case of the Takeda Patent made of plastic reinforced with carbon fiber, which is secured around a lens by means of screws inserted into interconnecting portions of the rim.

U.S. Pat. No. 4,390,256 to Bononi discloses a nose pad for spectacles having a high elasticity.

U.S. Pat. No. 4,142,784 to Bononi describes an eyeglass frame having nose pads which can be snapped into and out of the frame.

U.S. Pat. No. 4,021,103 to Gaspari discloses an eyeglass frame having ring-like lens receiving liners. The frames are rigid and the liners into which the frames are inserted are made of a flexible plastic.

U.S. Pat. No. 4,674,851 to Jannard discloses sunglasses to which a variety of nose pad pieces can be fitted.

U.S. Pat. No. 4,222,640 to Bononi discloses safety glasses having a hard plastic inner frame or core which is completely covered by a soft, elastic polyurethane foam.

U.S. Pat. No. 3,402,005 to Liautaud et al. is directed to eyeglasses wherein the hinged ends of the temple pieces are made of a stiff, temple portion provided adjacent to a spectacle hinge, wherein the temple portion adjacent the wearer's ear is softened and otherwise treated for adjustable bending.

The variety of construction of spectacle parts, as evidenced by the citation of the foregoing patents, indicates that it would be desirable to provide a composite spectacle part which has properties designed for the purpose to which the particular part is intended to be used. In particular, it would be desirable to provide a spectacle construction wherein rigid frames are provided for holding the lens and resilient, smooth elastomeric portions are provided for those parts which are adjacent to the areas which are in contact with the wearer's head. Such parts would include the bridge portion between the frames, the nasal tabs on the frames and the ear engaging portion of the spectacle bow.

Accordingly, it is a principle object of the present invention to provide a composite, integral polymeric spectacle part which has different functional features at different portions of the part.

It is another object of the present invention to provide a method for forming a composite, integral polymeric spectacle part wherein different polymeric portions of the spectacle part are fused together to provide the integral spectacle part.

It is a further object of present invention to provide a method for forming an integral, composite polymeric part where two or more polymeric materials are bonded together by heat fusion.

These and other objects will become more apparent from the following detailed description of the invention.

BRIEF DESCRIPTION OF THE DRAWINGS

FIG. 3 is a schematic plan view showing various steps involved in the manufacture of a bifurcated frame utilizing the composite polymeric structure of the present invention.

SUMMARY OF THE INVENTION

The present invention is directed to a composite, integral polymeric spectacle part. The spectacle part includes a first polymer member and a second polymer member. The polymer members are selected to provide desired characteristics for the spectacle part at the location of the spectacle part where the member is incorporated. In a particular embodiment, it is desirable that the first polymeric member be formed from an elastomeric polymer and that the second member be a substantially rigid polymer. The rigid polymer is preferably formed from a thermosetting polymer having a higher melting temperature than the first elastomeric member. The second rigid member is bound to the first polymer member by heat fusion during an injection molding process.

In the method of the invention for forming a composite, integral, polymeric spectacle part, a first polymer member is formed into a shape conforming to a portion of the cavity of an injection mold. The entire shape of the injection mold cavity defines the finished spectacle part. After the first polymeric member is inserted into the cavity portion, a second melted polymer, which has been heated to a suitable temperature above its melting temperature, is injected into the injection mold cavity so as to fill the cavity. The first polymer member and the second injected polymer are in abutting relationship in the injection mold cavity, A composite, integral polymeric spectacle part is prepared by activation and fusion of the first preformed polymer member by the heated second polymer.

DETAILED DESCRIPTION OF THE INVENTION

Figure 1:
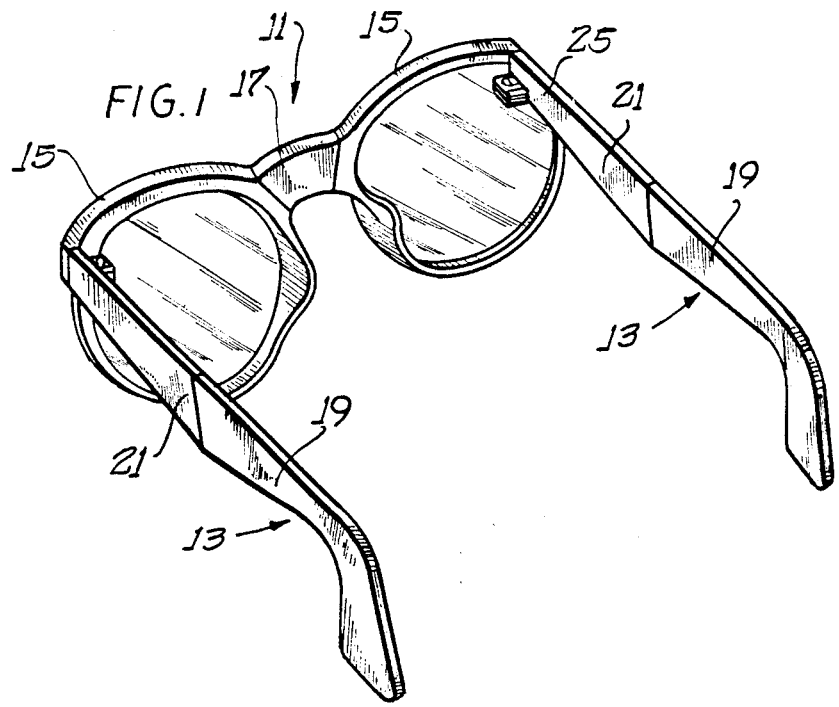
FIG. 1 is an isometric view of a pair of spectacles incorporating features of the present invention.

Referring now to FIG. 1, the composite polymer spectacle parts of the invention are shown in an assembled pair of spectacles. The spectacles generally include a bifurcated frame 11 and a pair of bows 13. The bifurcated frame 11 includes a pair of lens supports 15 which are joined by a bridge 17. The frame also includes nasal engaging pads 23. Each of the bows 13 include an ear engaging part 19 and a rigid stem part 21. The two bows are attached to the frame 11 by any suitable means, typically by the hinge and pin arrangement 25 shown in FIG. 1.

It is an important aspect of the present invention that the component parts of each of the spectacle parts, i.e., the two bows 13 and frame 11 can be made from dissimilar polymeric materials. In accordance with the invention, the dissimilar polymeric materials forming the component parts are fused together during the manufacturing process to provide an integral spectacle part without the need for any mechanical or adhesive interconnecting means. Heat fusion occurs during the manufacturing process whereby the parts are welded together during injection molding of the parts.

The component polymeric parts of each spectacle part are selected by the manufacturer to provide the physical properties which are most desirable for the particular component part. That is, the manufacturer might decide that the ear engaging part 19 of the bow should be an elastomeric polymer material of a certain hardness and the stem part of the bow should be a rigid polymeric material with a different hardness. The manufacturer might decide that the lens supports 15 should be a rigid polymeric material and that the bridge 17 and the nasal engaging pads 23 should be constructed of a resilient, elastomeric polymeric material. The use of an elastomeric, resilient polymer for the bridge 17 provides a spring zone which permits the frame 11 to be substantially distorted without breakage occurring. Any combination of desired physical properties can be incorporated into the spectacles to provide unique wearer enhancement, safety or aesthetic features.

Figure 2:
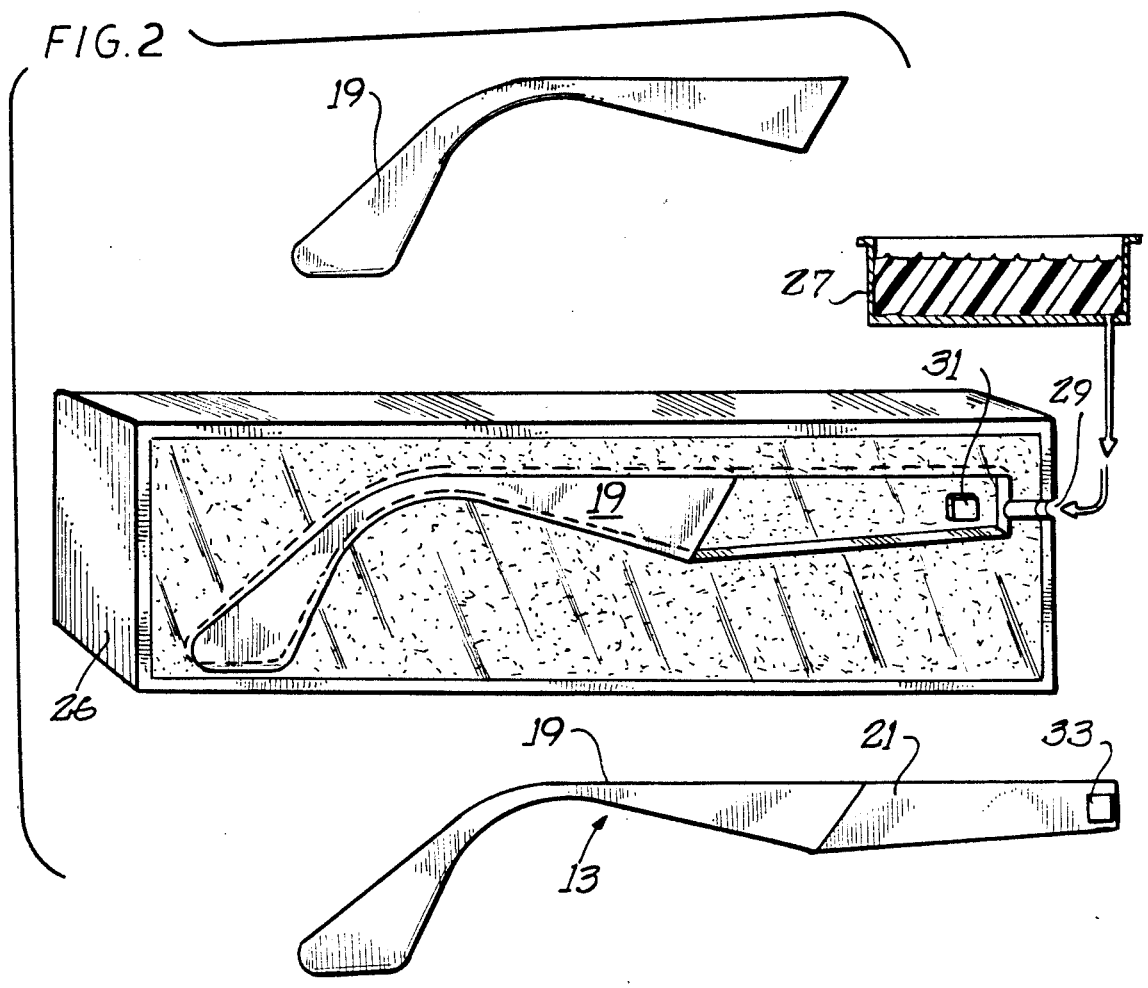
FIG. 2 is a schematic plan view of various steps involved in the method of the present invention for manufacturing a spectacle bow utilizing the composite polymeric structure of the invention.

The method of the invention is illustrated in FIG. 2 in connection with the manufacturer of a composite, integral polymer bow. In accordance with the illustrated method, an ear engaging part 19 of the bow is first formed by a suitable method to provide a first preformed polymeric member. A preferred method for forming the first member, such as the ear engaging part 19, is by injection molding. For illustrative purposes, it is assumed that the manufacturer desires the ear engaging part 19 to have resilient elastomeric properties. The first member is then selected from a polymeric material having the desired elastomeric properties.

The first polymeric member is then placed in a portion of the cavity of an injection mold 26. The entire cavity of the injection mold defines the shape of the spectacle part to be prepared, in this case the bow 13. After the first member is inserted into the cavity portion, the mold is closed and a second polymeric material which has been heated to a suitable injection molding temperature above its melting temperature is injected into the mold from a resin supply 26 through an injection port 29. The injected second polymer flows into the remaining portion of the cavity of the injection mold 26. As it flows into the remaining portion of the cavity, the second polymer fills the remaining portion of the mold and comes into abutting contact with the first preformed polymeric member. The temperature of the second melted polymer is such that activation and fusion take place between the first preformed member and the second injected melted polymer as the second injected polymer cools within the mold. The heat is sufficient to cause the two parts, i.e., the first preformed member and the second injected member, to weld into a permanent bond.

It is preferred that the polymer which is injected into the mold into abutting relationship with the preformed polymers be the polymer with a higher melting point. Preferably, the injected polymer will have a melting point at least about 5° C. higher than that of the preformed polymer. Most preferably, the melting point of the second polymer is from about 5° C. to about 20° C. higher than the melting point of the first preformed polymer. It should be understood, however, that the working temperature required for injection molding is substantially higher than the melting point temperature of a polymer. Usually, the temperature required for injection molding will be from about 40° C. to about 100° C. higher than the melting point temperature. Under some circumstances, the injected polymer, which is injected at the required working temperature, can have a melting point lower than that of the preformed polymer, as long as the temperature of the injected polymer at the time of injection is at least about 40° C. higher than the melting point temperature of the preformed polymer, preferably from about 40° C. to about 100° C.

In general, the polymeric resins suitable for use with the method of the present invention are thermosetting polymers selected from the group consisting of polyacrylates, such polymethyl methacrylate, polyacrylonitrile, polyamides, such as nylon 6, 6 and nylon 6, 10, polyesters, polyethers, polyfluorolefins, such as polytetrafluoroethylene, polystyrene, polysulfides, polysulfones, poly-p-xylylenes and polyvinyls. It should be understood that the first preformed member and the second injected polymer can be selected from polymeric resins which are the same class of polymeric material but which have different physical properties and/or melting points. For example, in a preferred embodiment of the present invention, a polyamide having a melting point of from about 160° C. to about 170° C. is used as a preformed member for the ear engaging part of a bow. The injected polymer is then preferably a polyamide having a melting point of from about 175° C. to about 185° C.

As shown in FIG. 3, a bifurcated frame 11 can also be manufactured by the method of the present invention. In the embodiment shown in FIG. 3, a bridge 17 is preformed from a desired polymer to provide a first preformed member. The bridge 17 is inserted into the central portion of the cavity of an injection mold 26. In this injection mold, two injection ports 29 are provided. The second melted polymer is then injected into each of the injection ports 29 from the resin supply 27. As each of the cavity portions into which the second polymer is injected is filled, the melted polymer flows into the cavity and comes into an abutting relationship with the preformed bridge 17. As described above, the second melted polymer, as it cools, causes heat fusion to occur between the bridge 17 and the lens support 15 which are made by cooling of the melted polymer.

As shown in both FIGS. 2 and 3, studs 31 can be provided in the injection mold to provide recesses 33 in the lens support 15 or the bow 13. Such recesses can be used for inserting a hinge part by frictional contact or by use of an adhesive.

The following examples further illustrate various features of the invention but are intended to in no way limit the scope of the invention which is defined in the appended claims.

EXAMPLE

A pair of spectacles was manufactured in accordance with the present invention which has unique properties. In a first manufacturing step, an ear engaging part of a bow was preformed by injection molding the part using a polyamide sold under the tradename Grilamid ELY2475 and having a melting point of from about 160° C. to about 170° C. This polyamide was a polyetheresteramide having a shore D hardness of about 56 and an injection working temperature of 210° C. The preformed ear engaging part was flexible and resilient.

The ear engaging part was then inserted into a portion of the cavity of an injection mold, as shown in FIG. 2. The entire shape of the mold cavity defines the bow to be manufactured, including a stem part 21. A second melted polyamide sold under the tradename Grilamid TR55LX and having a melting point of from about 175° C. to about 185° C. was injected into the remaining portion of the cavity through an injection port 29. This polyamide was a nylon 6, 6 having a shore D hardness of about 81 and an injection working temperature of 265° C. The injected polyamide fills the remaining portion of the cavity and comes into abutting relationship with the ear engaging part 19 which had been inserted previously into the mold. During cooling, fusion bonding took place between the ear engaging part at the stem part which had been injected molded into the cavity. Upon extraction from the mold a composite, integral bow had been formed which had a rigid stem part and a flexible resilient ear engaging part 19.

In a similar manner, a bifurcated frame was formed in accordance with the invention. A preformed bridge of the same polyamide used for the ear engaging part (Grilamid ELY2475) was formed by injection molding. The preformed bridge was elastomeric and resilient. The preformed bridge was inserted into a portion of the cavity of an injection mold, as shown in FIG. 3. The same polyamide used for the stem part of the bow (Grilamid TR55LX) was injected into opposite sides of the injection mold cavity through injection ports 29 at an injection temperature of 265° C. The flow of the injected polyamide caused the cavity to fill and the injected polyamide to come into abutting relationship with the preformed bridge 17. Upon cooling, a bifurcated frame was formed having a composite polymeric structure. The flexible bridge provided a unique frame structure which permitted the frame to endure substantial stress with only bending of the flexible bridge portion occurring and no fracture of the frame.

The spectacles were assembled by inserting suitable hinge components into cavities created in the bifurcated frame and the bows and assembling the bifurcated frame and bows in the usual manner.

In accordance with the present invention a unique manufacturing method is provided for manufacture of composite polymeric structures. While the invention has been particularly described with reference to the manufacture of spectacle parts, the method of the invention is generally applicable to the preparation of composite polymeric structures wherein different physical properties are desired. The method of the invention is particularly suitable for the manufacture of composite polymeric shapes wherein different physical properties or different aesthetic properties are desired.

What is claimed is:

1. A composite, integral polymeric spectacle part comprising a first polyamide member and a second polyamide member, said first polyamide member having a melting point of from about 160° C. to about 170° C. and said second polyamide member having a melting point of from about 175° C. to about 185° C., said second polyamide member having an injection molding temperature at least 40° C. higher than the melting point temperature of said first polyamide member and said second polyamide member having been heat fusion bonded to said first polyamide member to form said integral spectacle part.

2. A spectacle part in accordance with claim 1 which is a bow having an ear engaging part formed from a first elastomeric polyamide and a stem part formed from a second substantially rigid polyamide.

3. A spectacle part in accordance with claim 1 which is a frame having a bridge formed from an elastomeric polyamide and having two lens support members formed from a substantially rigid polyamide, said lens support members being heat fusion bonded to opposing edges of said bridge.

* * * * *